(12) United States Patent
Tais Zamir et al.

(10) Patent No.: US 9,796,613 B2
(45) Date of Patent: Oct. 24, 2017

(54) DRINKING WATER VENDING DISPENSER FACILITATED TO COLLECT AND PURIFY DRAINAGE WATER

(71) Applicant: Woosh Water System LTD, Kfar Saba (IL)

(72) Inventors: Itai Tais Zamir, Tel Aviv (IL); Ido Grinberg, Kfar Saba (IL); Amots Dgani, Kfar Saba (IL); Ronen Berman, Matan (IL); Haim Cikural, Bat Yam (IL)

( * ) Notice: Subject to any disclaimer, the term of this patent is extended or adjusted under 35 U.S.C. 154(b) by 390 days.

(21) Appl. No.: 14/369,563

(22) PCT Filed: Dec. 27, 2012

(86) PCT No.: PCT/IL2012/000399
§ 371 (c)(1),
(2) Date: Jun. 27, 2014

(87) PCT Pub. No.: WO2013/098807
PCT Pub. Date: Jul. 4, 2013

(65) Prior Publication Data
US 2015/0136666 A1 May 21, 2015

(30) Foreign Application Priority Data
Dec. 29, 2011 (IL) .......................................... 217275

(51) Int. Cl.
*C02F 9/00* (2006.01)
*B01D 61/08* (2006.01)
(Continued)

(52) U.S. Cl.
CPC .............. *C02F 9/00* (2013.01); *B01D 61/022* (2013.01); *B01D 61/04* (2013.01); *B01D 61/08* (2013.01); *B01D 61/12* (2013.01); *B01D 65/02* (2013.01); *B08B 9/027* (2013.01); *C02F 9/005* (2013.01); *G07F 13/065* (2013.01); *B01D 2311/04* (2013.01); *B01D 2311/06* (2013.01); *B01D 2311/2692* (2013.01); *B01D 2321/04* (2013.01); *B01D 2321/168* (2013.01); *B67D 2210/0001* (2013.01); *B67D 2210/00002* (2013.01); *B67D 2210/00013* (2013.01); *C02F 1/004* (2013.01); *C02F 1/283* (2013.01); *C02F 1/32* (2013.01); *C02F 1/441* (2013.01); *C02F 1/78* (2013.01);
(Continued)

(58) Field of Classification Search
None
See application file for complete search history.

(56) References Cited

U.S. PATENT DOCUMENTS

| 4,599,166 A | 7/1986 | Gesslauer |
| 4,801,375 A | 1/1989 | Padilla |

(Continued)

FOREIGN PATENT DOCUMENTS

| CN | 200951965 | 9/2007 |
| EP | 1695939 | 8/2006 |

(Continued)

*Primary Examiner* — Richard Gurtowski

(57) ABSTRACT

A drinking water vending dispenser for dispensing purified water comprising a coarse mechanical filter, an RO purification unit, an ozone purification unit, a UV purification unit, an active carbon filter, a chemical base purification unit and a fine mechanical filter.

2 Claims, 3 Drawing Sheets

(51) Int. Cl.
- *B08B 9/027* (2006.01)
- *B01D 61/02* (2006.01)
- *B01D 61/04* (2006.01)
- *B01D 61/12* (2006.01)
- *B01D 65/02* (2006.01)
- *G07F 13/06* (2006.01)
- *C02F 1/28* (2006.01)
- *C02F 1/32* (2006.01)
- *C02F 1/44* (2006.01)
- *C02F 1/78* (2006.01)
- *C02F 103/00* (2006.01)
- *C02F 103/32* (2006.01)
- *C02F 1/00* (2006.01)

(52) U.S. Cl.
CPC .... *C02F 2103/002* (2013.01); *C02F 2103/32* (2013.01); *C02F 2209/001* (2013.01); *C02F 2209/006* (2013.01); *C02F 2303/04* (2013.01); *C02F 2303/16* (2013.01); *C02F 2303/18* (2013.01); *C02F 2307/10* (2013.01)

(56) References Cited

U.S. PATENT DOCUMENTS

| | | |
|---|---|---|
| 5,911,884 A | 6/1999 | Boulter |
| 2002/0083842 A1 | 7/2002 | Kown |
| 2003/0099584 A1 | 5/2003 | Diang |
| 2005/0139530 A1* | 6/2005 | Heiss .................. C02F 9/00 210/85 |
| 2007/0181496 A1 | 8/2007 | Zuback |
| 2009/0289011 A1 | 11/2009 | Avakian |

FOREIGN PATENT DOCUMENTS

| | | |
|---|---|---|
| WO | WO2007037985 | 4/2007 |
| WO | WO2009126579 | 10/2009 |

* cited by examiner

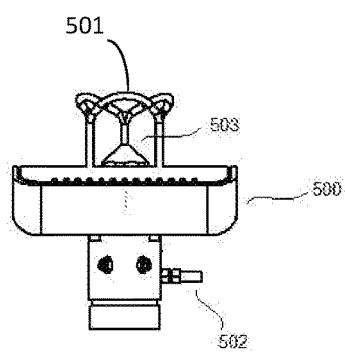
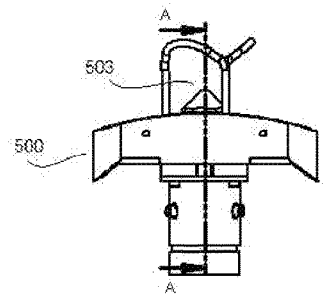
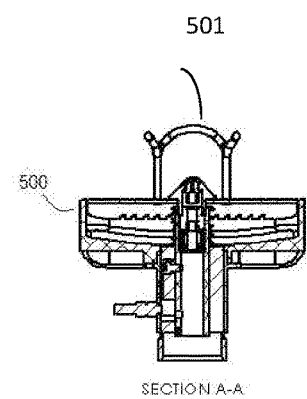
FIG 5　　　　　　　　FIG 8　　　　　　　　FIG 9
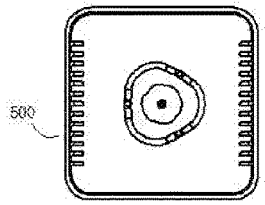
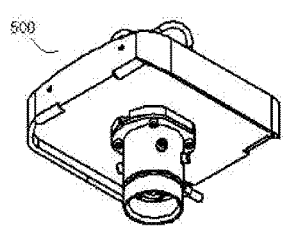
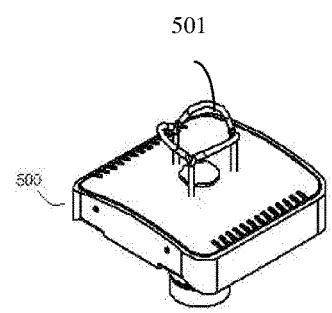
FIG 6　　　　　　　　FIG 7　　　　　　　　FIG 10

US 9,796,613 B2

DRINKING WATER VENDING DISPENSER FACILITATED TO COLLECT AND PURIFY DRAINAGE WATER

RELATED APPLICATIONS

This application claims priority of a PCT/IL2012/000399 filed on 27 Dec. 2012 which claimed priority of Israeli patent application number 217275 filed on 29 Dec. 2011.

FIELD OF THE INVENTION

This invention relates in general to water purification systems and more particularly, the present invention relates to water purifying units, including in vending dispensers for dispensing drinking water that offer also a water vessel disinfection, with water enriched with ozone. The drinking water vending dispenser machine recycles substantially all the waste water generated by the system. The system may also include any type of water inlets, be it clean or contaminated, and a series of water purifying units that purifies substantially all the incoming water.

BACKGROUND OF THE INVENTION

Water quality is deteriorating all over the world, where pollution contaminates many natural water resources. According to updated data revealed in a recent "UN water report", the world is on the verge of a water crisis. Currently, over 2 billion citizens around the world have no access to safe drinking water. As a result 80% of illness and death in underdeveloped countries is due to water contamination. The report stated that managing drinking water is essential if the world is to achieve sustainable living.

Hence, safe drinking water is becoming a very valuable recourse, one that should be dealt with great care, especially when planning a water treatment system. Drinking water is a valuable resource, especially after a partial purification or complete purification stages have been applied on it. There are particle filters, activated carbon filters, ozone based purification, reverse osmosis (RO) based purification, Ultra Violet (UV) based purification, processing and others.

Current art provides a variety of water purification methods each having drawbacks, such as partial purification, high cost and producing a large quantity of wasted gray water. Farther more, in developed countries there is a current trend of banning the usage of bottled water in plastic bottles. Major cities around the world have banned already bottled water in the public domains. For example, London banned the usage of bottled water in the public domain on Jan. 1, 2010. As for this date it is illegal to sell plastic bottles containing water on the streets, shopping malls, schools etc. As a result of such laws, there is a great need for an alternative solution for drinking water in the public domain. The term "gray water" as used herein refers to waste water that is a product of one or a combination of the following sources: drain water as a result of the purification element of the system, water from a drinking water faucet, water from the bottle disinfection procedure and drained, leaks within the tubing of the system and a result of system cleaning processes using back flush, to clean the filters and/or ion-exchange and adsorption systems. Currently, an individual wanting to drink water in public places such as on the street/school/mall etc, is presented with two main options:
a) Tap water from fountains (which people don't trust and can be even less safe than tap water):

Not safe due to various possible water contaminations, such as bacteria, chemicals, etc.

b) A common solution for drinking water on the street is by consuming mineral water:

Not safe due to various possible water contaminations, such as: Toxic chemicals like BPA, leached from plastic bottles. Bottled water is a habitat for microbes.

Not Green: the bottled water industry is responsible for great damage to the environment. The bottled water industry produces an annual Carbon foot print of 25,000,000 tons, uses 170,000,000 barrels of oil and only 10%-14% of the bottles wind up being recycled. In addition, transporting and marketing these bottles creates an additional environmental damage. For example, 25% of the bottled water is flown around the world. That's a significant additional carbon print.

Very expensive, substantially more expensive than tap water.

There is a growing global demand for saving energy and resources. In light of the global ecological condition, a quick reduction of pollution levels (carbon foot print) and an increase in water savings are urgently needed.

There is therefore a need for and it would be advantageous to have a system providing a sustainable, environmental-friendly, healthy and cost effective solution for consuming water in public spaces, a system that can help minimize ecological and health hazards as well. Water purification systems for public and household use are well known in the art, including patents that describe waste water circulation but to a limited extent in order to reduce the drainage flow. In addition the waste water recycling is targeted to drain water which water is a byproduct of the purification process. The circulation issue was addressed in U.S. Pat. Nos. 4,599,166 and 6,099,735 where water is circulated and treated with ozone in order to eliminate biological mater within suspended water vessel. U.S. Pat. No. 5,997,738 provides a RO system that recycles part of the RO drain water. U.S. Pat. No. 4,554,688 presents again similar idea for heating/cooling systems. Patent CN200951965 Y where there is up to 100% waste water recycling.

However there is no suggestion to eliminate the waste water completely in a drinking water vending and/or dispenser machine. waste water in a drinking water vending machine could be a product of one or a combination of the following sources: drain water as a result of the purification element of the system, water streaming out of a drinking water faucet, water streaming from the bottle disinfection procedure and drained, leaks within the tubing of the system and a result of system cleaning processes using back flush, to clean the filters and/or ion-exchange and Back flush, which is a reverse flow of the water in a system, in order to clean the system from accumulated contaminating elements, is described in USP application 20020008068 by Gary L. Anderson as a method for cleaning a fluid filter.

SUMMARY OF THE INVENTION

By way of introduction, the principal intentions of the first embodiment of the present invention include providing water purifying vending dispenser (hereinafter "the Water Purifying Vending Dispenser" OR "the System"), designed to eliminate a substantial quantity of the drainage stream of the System. The Water Purifying Vending Dispenser includes one or more purification units. The invention of the patent application is applicable mainly when the inlet water stream is from any kind of water—municipal drinking water, well water, gray water, air conditioning condensate water or collected rain water. According to the teachings of the present invention there is provided the Water Purifying Vending Dispenser including a water inlet pipe, a drainage water container, water purifying subsystem, an optional water chiller, a purified water outlet, an optional cold purified water outlet, a controller, a payment subsystem and a user interface.

The second embodiment of the System includes an internal subsystem designed to test the quality of the water entering the system in real time and thus control the level of purification required for the incoming water. In addition, another version of the System includes purification and sterilization of the water and subsystems that use ozone which is generated internally within the System.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIGS. 5-10 describe the safety mechanism (500).

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art. Unless otherwise defined, all technical and scientific terms used herein have the same meaning as commonly understood by one of ordinary skill in the art to which this invention belongs. The methods and examples provided herein are illustrative only and not intended to be limiting.

Figure 1:
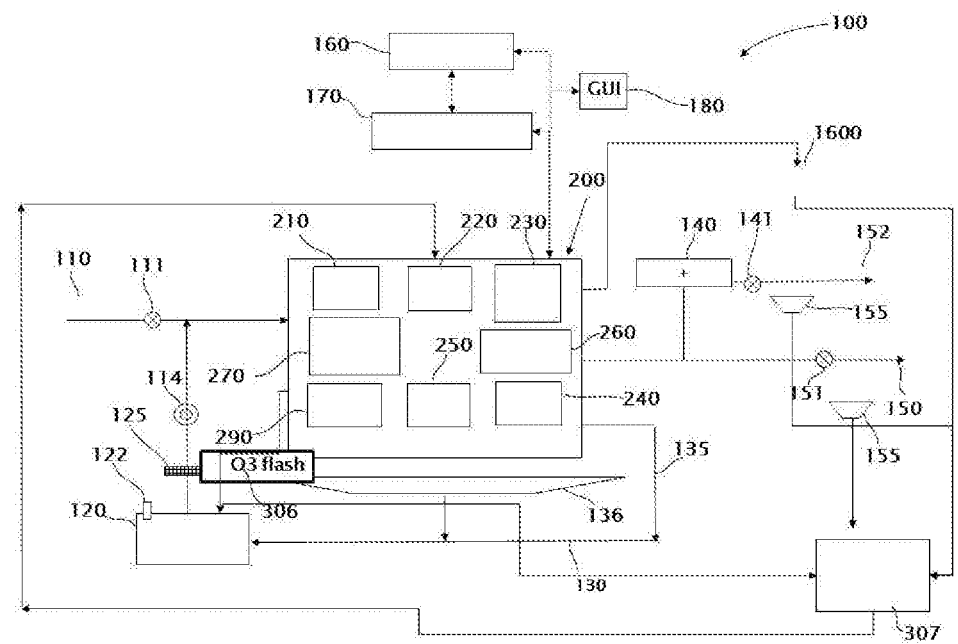
FIG. 1 is a schematic block diagram illustration of the water purifying vending dispenser (100).

Reference is now made to the drawings. FIG. 1 is a schematic block diagram illustration of the Water Purifying Vending Dispenser 100, according to embodiments of the present invention. The Water Purifying Vending Dispenser 100 includes a water inlet pipe 110, a drainage water container 120, water purifying subsystem 200, an optional water chiller 140, a purified water outlet 150, an optional cold purified water outlet 152, a controller 160, a payment subsystem 170 and a user interface 180.

The Water Purifying Vending Dispenser 100 may have a variety of input water sources serving as an input water stream fed into water purifying subsystem 200. The input water stream may include tap water from water inlet 110, well water, gray water from air conditioning condensate water or collected rain water, or any other source of gray water.

The water purifying subsystem 200 may include two or more water purification means. The water purifying subsystem 200 May include a coarse mechanical filter 210 for collecting particles, typically larger than 50 µm, a reverse osmosis (RO) system 220, an ozone purification unit 270, an active carbon filter 230, a fine mechanical filter 240 for collecting particles, typically larger than 1 µm, an UV purification unit 250, a chemical based purification unit 260 such as Chlorine based, purification unit 260 and other filters and purification units 290, for example de-ionizing devices, and others.

Many of said purification units perform processes in which one portion of the incoming water is purified and thereby producing purified water, and the other portion of the incoming water deteriorates and thereby producing drained water. Often, the drained water portion is substantially larger than the purified water portion. For example, in a typical RO purifying system, the ratio is 1:5. That is, 1/5 of the incoming water is purified water and 4/5 becomes drained water.

An aspect of the present invention is to recollect the drained water, which drained water are than re-entered into water purifying subsystem 200 to be re-processed. The drained water of the purifying subsystem 200 is collected directly by a purification waste water pipe 135, which directs it to the main drainage water pipe 130. All drained water flows into the drainage water container 120, to be transferred at a later stage to the water purifying subsystem 200, for reprocessing. Drained water from a collecting sink 155 of the water streaming of the Ozone (O3) sanitary flush outlet 1600 (the vessel disinfection system) will not flow to the drainage water container 120 but, flows to the external drainage water container 307 and from there directly to the purifying subsystem 200.

The purified water portion streams through a purified water outlet 150 to be consumed. In variations of the present invention, the purified water portion is passed through a chiller 140 in order to provide cold drinking water through a cold purified water outlet 152.

Typically, water outlet 150 and 152 include a collecting sink 155 or any other drain water collecting mechanism. It is an aspect of the present invention to recollect the drained water from sinks 155, which drained water are then transferred to drainage water container 120 via the main drainage water pipe 130. Preferably, the Water Purifying Vending Dispenser 100 further includes a Drop sink 136 to collect water leaks, when such water leaks out of the system components occur. The collected water leaks are lead into drainage water container 120 via the main drainage water pipe 130.

In variations of the present invention, the drinking water vending dispenser, with a water purifying subsystem 200, includes a back flush mechanism. The back flush subsystem activates a reverse water current flow ("back flush") to flush/wash one or more water purification units of water purifying subsystem 200.

The purifying and antibacterial properties of purifying system 200 may be used in order to clean and sanitize the tubular components of the System 100. These purification systems may use an ozonized water unit, a Chlorine based unit or any other chemical used for bacterial treatment of water or any purifying unit that provides clean purified water.

Figure 2:
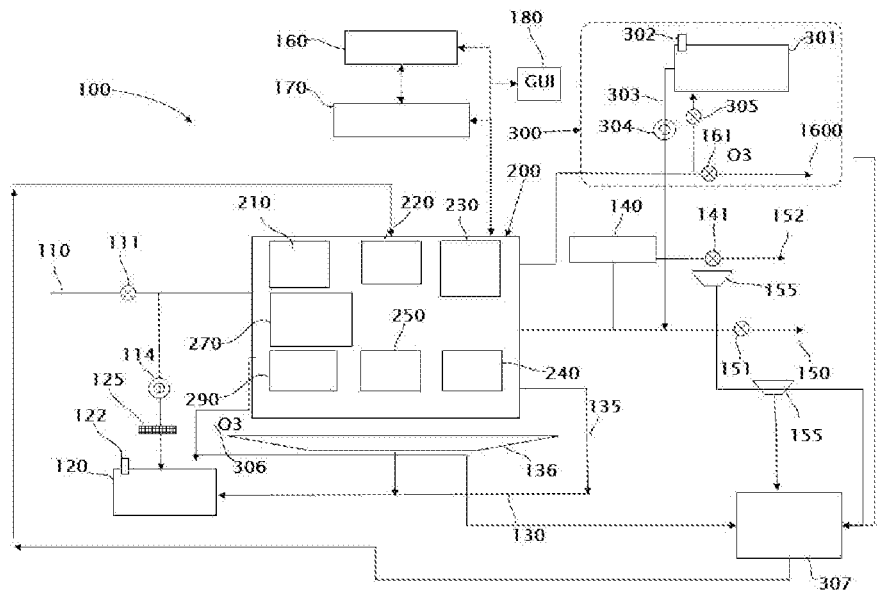
FIG. 2 is a schematic block diagram illustration the water purifying vending dispenser with a back-flush mechanism (300).

Reference is also made to FIG. 2, which is a more detailed example schematic block diagram illustration of the Water Purifying Vending Dispenser 100, according to variations of the present invention. The Water Purifying Vending Dispenser 100 includes a Buck Flush subsystem 300 that streams a reverse current flow (the Back Flush) into tubular components of System 100. Back Flush subsystem 300 includes a sanitary water container 301 having a water level sensor 302, a Back Flush water pump (BF water pump) 304 and an inlet sanitary pipe 303. Water level sensor 302, BF water pump 304 and a back flush water valve (BF water valve) 305 are operatively connected to controller 160.

When the controller 160 activates the back flush mode, the BF water valve 305 is opened, an Ozone water valve 161 is closed and purification subsystem 200 is turned on. Thereby, sanitary water container 301 is filled with sanitary water. When water level sensor 302 senses a predesigned high water level, the controller 160 shuts down the operation of purification unit subsystem 200, activates BF water pump 304, and closes inlet water valve 111. Thereby, a reverse current of sanitary water is streamed into designated purification units of purification unit subsystem 200, typically, into tubular components. When water level sensor 302 senses a predesigned low water level in sanitary water container 301, the controller 160 deactivates the back-flush mode, thereby System 100 returns to normal operation mode. All the back-flush water flows from purification unit subsystem 200 to drainage water container 120 via purification waste water pine 135.

Figure 3:
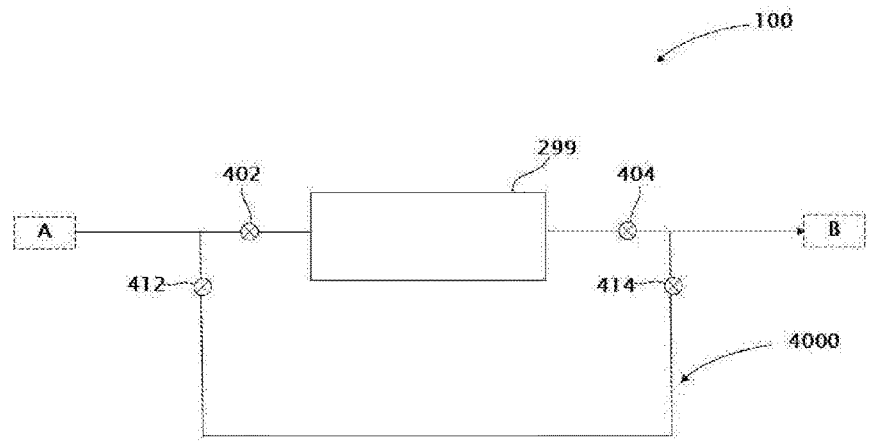
FIG. 3 illustrates the water purification vending dispenser (100).

Reference is now also made to FIG. 3, which illustrates the System 100 having the back-flush subsystem. The System 100 includes a water purifying unit 299, which unit 299 is sensitive to the back-flush process. To prevent any harm to unit 299. Therefore, the System 100 in this version includes a bypass mechanism. (4000). The bypass mechanism (4000) includes four valves: 402, 404, 406412 and 408414.

When the controller 160 sets the System 100 to operate in a normal mode, then the inlet water flows from location A towards location B. The inlet water flows into the purification unit 299 via bypass entrance valve 402 (BPEN valve) and exits purification unit 299 via bypass exit valve 404 (BPEX valve). In this mode, a Block Entrance Bypass valve 412 (BBPEN valve) and 408 Block Bypass Exit valve 414 (BPBEX valve) are closed. When the controller 160 sets the System 100 to operate in a back flush mode, then the valves 402 and 404 are closed and valves 406412 and 408414 are opened. The water now flows from location B towards location A through the opened valves 412 and 414 and the purifying unit 299 is not exposed to the back flush process. Valves 402, 404, 412 & 414, are operatively controlled by the controller 160.

Generally, drainage water container 120 collects drained water from substantially all drained water generating members of the System 100. The collected water is then transferred at a later stage to water purifying subsystem 200, for reprocessing. It should be noted that gray water can be also transferred to drainage water container 120 from external sources such as air conditioning condensate water, collected rain water or any other source.

The System 100 further includes the controller 160, the payment subsystem 170 and the user interface 180, typically a graphical user interface (GUI). The controller 160 controls substantially all operational aspects of the System 100. Drainage water container 120 includes water level sensor 122, (hereinafter "the DC level sensor"), which senses the water level in the drainage water container 120. The DC level sensor 122 is operatively connected to controller 160. When the DC level sensor 122 senses a predesigned high water level, the controller 160 closes the inlet water valve 111, activates a drainage water pump 114, thereby streaming gray water from the drainage water container 120 to the water purifying subsystem 200. Optionally, in order to protect pump 114 and reduce the impurities entered to the subsystem 200, one or more filters, such as a course mechanical filter 125 (hereinafter "the drainage filter 125") are disposed between drainage water container 120 and pump 114.

When the DC water level sensor 122 senses a predesigned lower water level, in container 120, then the controller 160 deactivates the drainage water pump 114, opens the inlet water valve 111, thereby streaming the inlet water from water inlet 110 to water purifying subsystem 200.

After a user makes a payment via payment subsystem 170, the controller 160 opens either an outlet water valve 151 or a cold water valve 141, thereby purified water is dispensed via purified water outlet 150 or cold purified water outlet 152, respectively.

The System 100 may further include a Safety Mechanism (500) for washing a bottle by Ozone enriches water: Purification of bottles by water enriched with Ozone may cause for some drops of such water to splash onto a user. The inventors developed a Safety Mechanism (500) as described in FIG. 5 until 10. The Safety Mechanism (500) includes an upper adapter (501) on which the bottle is vertically inserted, a pressure sensor (502) and a vertical narrow tube (503). The upper adapter (501) is designed in manner that variety of bottles can be inserted into it. The sensor (502) is activated by pressure on the upper adapter (501) and only after a user press vertically downward on the bottle while it is inserted and located onto the upper adapter (501) then the sensor (502) let Ozone enriches water to stream through the vertical narrow tube (503) into the bottle. The vertical narrow tube (503) is located in the center of the upper adapter (501) in a way that it is inserted into the neck of the bottle when the bottle is inserted onto the upper adapter (501). In this way, only when the vertical narrow tube is inserted in the neck of the bottle and only when the user press vertically on the bottle the water will be stream out into the bottle and there is small risk that drops will splashes onto the user.

The second embodiment of the Water Purifying Vending Dispenser 1000 includes a subsystem that enables to test the incoming water in order to determine the intensity of treatment the water must undergo so that it is fit for drinking: the poorer the quality of the water, the greater the intensity of purification required. The intensity of purification applied to the incoming water is controlled by the amount of ozone mixed into the water in the purification process and the duration of the water's exposure to the ozone. Thus, the water is treated correctly and precisely according to its actual condition rather than according to a uniform and average criterion, which by nature is not exact. The System 1000 also includes internal subsystems designed to sterilize and purify the System's other subsystems using ozone-enriched water and to rinse the user's external bottles before filled them with drinking water.

Figure 4:
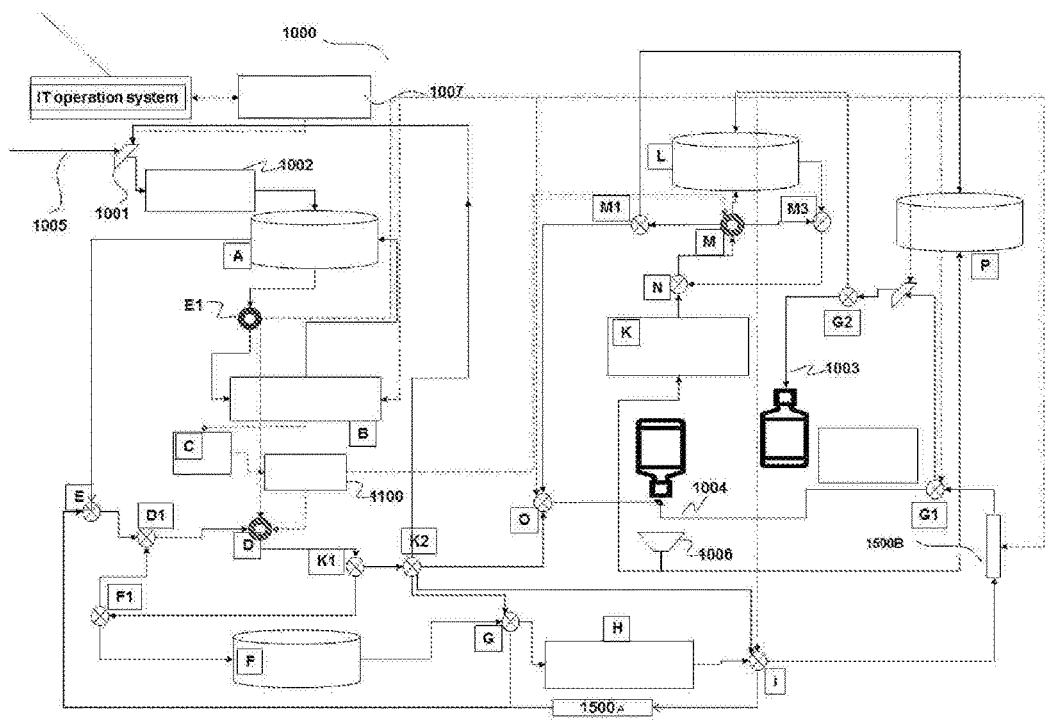
FIG. 4 illustrates the schematic structure of the water purification vending dispenser.

FIG. 4 presents a schematic diagram of the System 1000 including the following main components: One or more first testing sensors (1001) for identifying contaminations; initial filtering system (1002); initial water container (A); ozone generator that includes a reverse osmosis filtering system (B); ozone storage container (C); water treatment container (F); secondary filtering system for water designated for drinking (H); filtering system for rinse water (K); rinse water container (L); waste water container (P); outlet for drinking water (1003); orifice/sprayer for rinsing bottles (1004); control unit (1007); pumps, valves and piping as depicted in FIG. 4 and as described below.

As mentioned, FIG. 4 depicts the structure of the system (1000). In order to explain the function of each component and the designation of the containers, pipes, valves, pumps and other system components, several of the water's paths for purification, rinsing, cleaning and disinfection, and drinking will be described as well as the passage of the ozone gas takes through certain points in the system (1000).

Thus, the following description will include the structure of the system, its components and the mutual relations between them in all that pertains to the entry of the water into the system (1000), the generation of ozone, the reuse of water discharged during the ozone-generation process, the transfer of the water to the treatment container (F) and its interaction with the ozone, cleaning the purified water from the remaining ozone, the supply of the purified water for consumption by the user, rinsing of bottles, and circulation of the water in the system's subsystems in order to maintain water quality and to clean and disinfect the piping and subsystems.

Path I—Ozone Production: Flow of Water from Inlet (1005) to System (1000) Through Initial Container (A) to Ozone Generator (B):

Water arrives at the inlet (1005) to the system (1000) from the municipal water supply, though the system may be fed with water from a variety of sources including rain water, water after industrial use, and so on. The water passes through the initial filtering system (1002) to the initial container (A), to the subsystem (B) where they undergo reverse osmosis, and on to the ozone generator. The reverse osmosis treatment is given mainly in order to prolong the life of the ozone generator. The ozone generated is circulated in to the ozone container (C). A pump (E1) is installed between the initial container (A) and the ozone generator (B), which pumps the water from the initial container (A) into the ozone generator (B). Since about 85% of the water is discharged when ozone is produced from water, and since the system (1000) does not discharge water into the drain but rather reuses it, the discharged water is circulated through a pipe to the initial container (A) for reuse. Since the pump E1 is connected to the initial container (A), the system (1000) can be connected to an external rain or drainage water container and the pump will pump the water into the system through the inlet (1005), so that the system (1000) does not necessarily require external water pressure in order to intake the water. Instead of an ozone generator (B) with a storage container (C), ozone generators of other known kinds may be used that can be installed on the pumps (D) (M) or on the appropriate pipes and that are capable of producing ozone and infusing it directly into the water pipe in response to instructions received from the control unit (1007).

Control:

The control unit (1007) activates the pump E1 and the ozone motor B in response to users' demand, primarily for drinking water, so as to intake external water into the system (1000), starting with the initial container (A) and the ozone gas production unit.

Path II—Flow of Water from Initial Container (A) to Treatment Container (F):

Water flows in pipes from the initial container (A) to the treatment container (F) through valve (E), valve (D1), pump (D), valve (K1), valve (F1) and finally to treatment container (F). The pump (D) pumps water from the initial container (A) to treatment container (F) while drawing ozone gas from container (C) so that the water entering treatment container (F) is mixed with ozone. The manner in which the valves (junction valve) open determines the destination of the water. The presence of the water and ozone together in treatment container (F), in fact constitutes the disinfection and purification required so as to serve as drinking water for the system's users. Command and control: The control unit (1007) transfers water to treatment container (F) according to need and uses pump (D) to mix it with ozone.

Path III—Flow of Water from Treatment Container (F) to Outlet (1003):

When a user wishes to consume drinking water from the system (1000), water flows from the treatment container (F) to the water outlet (1003) as follows: water flows from treatment container (F) to valve (G) and on to the secondary filtering system (H), which includes a filter designed to remove the remaining ozone from the water in order to supply the user with purified, ozone-free drinking water. The secondary filtering system (H) can include, for instance, a filter based on active carbon, which is efficient in removing ozone from water. From the secondary filtering system (H) the water flows though valve (I) to valve (G1) and on to the water outlet (1003). Command and control: In response to the user's request for drinking water from the system (1000), the control unit (1007) issues an instruction to transfer water to the outlet (1003) as described above. This is done by pump (D) which pumps water from container (A) to container (F) and by opening the aforementioned valves.

Path IV—Initial Rinsing of Bottle:

This path refers to the case in which the consumer wishes to fill an external bottle of his or her own with drinking water from the system (1000). The system (1000) enables the user to rinse his or her bottle with ozone-enriched water so as to clean and disinfect it. In order to do so, the user must direct the bottle towards the rinse water orifice/sprayer (1004). Water first flows through valve O directly to the orifice/sprayer (1004). After use, the rinse water run-off drains into a funnel (1006) and flows into the waste water container (P). If there is water in rinse water container L, the initial rinse is executed using ozone-enriched water from container L, which flows through valve N, to pump M, and then on to valve O and the orifice/sprayer (1006). Water from waste water container P is collected and removed from the system (1000) manually, with no need for an external drain system.

Path V—Second Rinsing of Bottle:

Ozone-enriched water flows to the orifice/sprayer (1006) from treatment container F through valve G, valve E, pump D, valve K1, valve K2, valve O and finally to the sprayer (1004). Run-off from the second rinsing is collected by funnel (1006) and flows into rinse water filtering system K, and from there, through pump M, to rinse water container L. Pump M is connected to ozone container C, so that the water that flow through it are enriched with ozone for disinfection and purification.

Path VI—Third Rinsing of Bottle:

Ozone-free water is used for the third and final rinsing of the bottle. The water in this case comes through filtering system H, which as mentioned removes remaining ozone from the water, to valve I, and on to valve G1 and sprayer 106. The run-off from the third rinsing is also collected into container L through the same path as in the second rinsing.

Path VII—Circulation of Water in Rinse Water Container L:

In order to prevent accumulation of contaminants in the water in container L, the system (1000) circulates the water as follows: Water is circulated by pump M from container L through valve N to pump M, which returns the water to container L. This happens any time the water in container L is not user for a preset time period.

Path VIII—Enrichment of Water in Treatment Container F with Ozone:

In order to enrich the water in treatment container F with ozone, the water is circulated as follows: Water is circulated from container F through valve G to valve E, and on to valve D1 and to pump D, which draws ozone from the ozone container C, pumps it into the water and pumps the ozone-enriched water through valve K1, to valve F1 and back into treatment container F. Thus, the system (1000) controls the amount of ozone in the water in container F as well as the time during which the ozone is in the water, which enables to control the purification intensity of the water.

Path IX—Rinsing Secondary Filtering System H:

In order to rinse, clean and disinfect the secondary filtering system H, water is circulated as follows: Ozone-enriched water flows from treatment container F through valve G, to valve E and on to valve D1 and to pump D where the water is mixed with ozone, preferably at high concentration. From the pump, the water flows through valve K1, to valve K2, to valve G and on to secondary filtering system H, for rinsing, cleaning and disinfection. From the secondary filtering system H, the water is circulated through valve I to valve E, and on to valve D1, through pump D to valve K1 and then back to treatment container F through valve F1.

Path X—Cleaning and Disinfection of the Piping Before Consuming the Drinking Water:

It is highly recommended, before water is output through the outlet (1003) that ozone-enriched water be circulated through the pipes in order to clean them, as follows: Water flows from container F, through valve G to valve K2 and valve I and then on to valve G1 and outlet sprayer (1004), where the water is not sprayed out but rather just pass through the pipe and continue to rinse water container L. The ozone-enriched water can also be circulated through the sprayer (1004) and outlet (1003) so as to disinfect the nozzles and the nozzle area. Run-off is then collected into the rinse water container L, as described in the application in other contexts.

Path XI—Rinsing the Initial Filtering System (1002) and Inlet Pipes (1005):

In order to rinse, clean and disinfect the initial filtering system (1002) and inlet pipes (1005), for instance if contaminated water entered into the system (1000), disinfection may be performed as follows: Ozone-enriched water flows through valve K2 to the water inlet pipe (1005) and on through the initial filtering system (1002) to the initial water container (A).

Disinfection of Waste Water Container P:

In order to prevent accumulation of bacteria in container P, we recommend circulating small volumes of ozone-enriched water into it as follows: ozone-enriched water from container L is circulated through pump M, which enriches the water with ozone, and pumps the water directly into container P through valve M.

True-Time Determination of Intensity of Purification and Treatment of Incoming Water:

Sensors (1001), designed to test the quality of the water and input this information into the control unit (1007), are positioned at the inlet to the system. The control unit (1007) determines the intensity of treatment required according to the real-time quality of the incoming water: concentration of ozone to be pumped into the water, the duration the ozone will be in the water (in treatment container F), re-enriching the water with ozone, and prevention of the consumption of water from the system in cases of severe contamination that cannot be treated by the system. The system's ability to test and identify the quality of incoming water in real time enables municipal systems to send incoming water quality information to a central supervision center, so that conclusions may be drawn and actions taken in relevant areas according to the real-time condition of the water, due to, among other things, concern about the penetration of sewage into the municipal water system.

Ozone Monitoring System (1100):

For using the Ozone in the water treatment container (F) with proper amounts and in proper periods in the inventors added to the System (1000) the Ozone Monitoring System (1100) as shown in FIG. 5.

The System 100 may also include a heating elements 1500A and 1500B for heating and circulating water in case of low temperature for preventing the freezing of the water and pipes in the System.

Inner Circulation of the Water Before Consumption:

In most of the water purification systems, a carbon filter is placed last on the outlet piping. It is known that even after the water is being purified by a given purification method, there is a problem due to the fact that the water that exists and remain in the last carbon filter are accumulating bacteria, due to the fact that the water are still, without any disinfected agent (Chlorine/ozone etc.) furthermore, in most of dispenser there is a cooling system, that supply water cooled. There is a problem with the last carbon filter as the water that is in it become hot relatively. The System (1000) of the present invention gave good solution for this problem by that when the user demand water from the system (1000) then the System (1000) makes an inner circulation that stream the water that exists in the Filter (H) for treatment (by ozone) and only after streaming of about 1000 ml the fresh treated and cooled water from the container F are streamed for consumption. In this way that user gets cold and purified water.

The system (1000) described above is considered to be innovative in light of the following functions, among other things: there is no need for a water drainage system, the system disinfects its piping and internal subsystems using ozone-enriched water that it produces itself; the system offers several levels of rinsing and disinfection of external bottles used by users for drinking water; the system disinfects and rinses the water outlets; and determines the intensity of water treatment required according to the real-time quality of the incoming water.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A water purifying vending dispenser 100 comprising: a water inlet pipe 110, a water purifying subsystem 200, a purified water outlet 150, an Ozone sanitary flush outlet 1600, one or more collecting sinks 155 for drainage water of said Ozone sanitary flush outlet 1600 and for drainage water of said purified water outlet 150, a main drainage water pipe 130, a purification waste water pipe 135, a drainage water container 120, an external drainage water container 307, a back flush subsystem 300, a safety mechanism 500 for washing a bottle by Ozone enriched water and a controller 160;

wherein said water purifying subsystem 200 includes one or more water purification means; wherein drainage water from said purifying subsystem 200 are collected into said drainage water container 120 via said purification waste water pipe 135 and via said main drainage water pipe 130; wherein drainage water from said one or more sinks 155 of said Ozone sanitary flush outlet 1600 and of said purified water outlet 150 are collected into said external drainage water container 307 and from there into said purifying subsystem 200;

wherein said drainage water container 120 includes a drainage container water level sensor 122 designed to sense water level in said drainage water container 120; wherein said drainage container water level sensor 122 is operatively connected to said controller 160; wherein when said drainage container water level sensor 122 senses a predesigned high water level, then said controller 160 activates a drainage water pump 114 for streaming water from said drainage water container 120 to said water purifying subsystem 200;

wherein said back flush subsystem 300 includes a sanitary water container 301 having a water level sensor 302, a back flush water pump 304, an inlet sanitary pipe 303 and a back flush water valve 305; wherein said water level sensor 302, said back flush water pump 304 and said back flush water valve 305 are operatively connected to said controller 160; wherein when said controller 160 activates said back flush subsystem 300 into a back flush mode, then said sanitary water container 301 are filled with water and said water streams away from said sanitary water container 301 and into other components of said water purifying vending dispenser 100;

wherein said safety mechanism 500 includes an upper adapter 501, a pressure sensor 502 and a vertical narrow tube 503; wherein said upper adapter 501 is designed to receive variety of bottles; wherein said pressure sensor 502 is activated by vertical pressure on said upper adapter; wherein when said pressure sensor 502 is activated then Ozone enriched water can stream via said vertical narrow tube (503) into said bottle; wherein said vertical narrow tube 503 is located in the center of said upper adapter 501; and whereby said vertical narrow tube is inserted into a neck of said bottle when said bottle is inserted onto said upper adapter 501.

2. A water purifying vending dispenser 1000 comprising: a water inlet 1005, one or more first testing sensors (1001) for identifying contaminations, initial filtering system (1002), initial water container (A), ozone generator that includes a reverse osmosis filtering system (B), ozone storage container (C), water treatment container (F), secondary filtering system for water designated for drinking (H), filtering system for rinse water (K), rinse water container (L), waste water container (P), outlet for drinking water (1003), a sprayer for rinsing bottles (1004), and a control unit (1007);

wherein said water inlet 1005 is designed to receive water and to stream the water via said initial filtering system (1002) and via said initial container (A) into said reverse osmosis filtering system and Ozone generator (B); an Ozone generator pump (E1) pumps water from said initial container (A) into said ozone generator (B); wherein ozone-enriched water which produced in said Ozone generator (B) are stored in said Ozone storage container (C); water discharged from said Ozone generator (B) are circulated through a pipe to the initial container (A) for reuse;

wherein a water Ozone pump (D) pumps and mixes water from said initial container (A) and drawing ozone gas from said Ozone storage container (C) into said treatment container (F);

wherein water Ozone pump (D) designed to stream water from said water treatment container (F) into said secondary filtering system (H) and then to said outlet for drinking water (1003); wherein said secondary filtering system (H) includes a filter designed to remove remaining ozone from the water in order to supply a user with ozone-free drinking water;

wherein said water purifying vending dispenser 1000 is designed to enable a user to rinse a bottle with ozone-enriched water wherein said water Ozone pump stream (D) said ozone-enriched water from said water treatment container (F) to a sprayer for bottles (1004); wherein said water purifying vending dispenser 1000 is designed to recollect rinse water run-off drains from said sprayer for bottles (1004) into a funnel (1006); wherein said rinse water run-off drains streams into said rinse water container (L); wherein in order to prevent accumulation of contaminants in the rinse water run-off drains in the rinse water container (L) the water purifying vending dispenser 1000 is designed to circulate by a pump (M) the rinse water run-off drains in the rinse water container (L);

wherein said water purifying vending dispenser 1000 is designed to enable a user to rinse a bottle with ozone-free water from said secondary filtering system (H);

wherein said water purifying vending dispenser 1000 is designed to enrich the water in said treatment container (F) with ozone from said ozone storage container (C);

wherein said water purifying vending dispenser 1000 is designed to rinse said secondary filtering system (H) by Ozone-enriched water from said treatment container F;

wherein said water purifying vending dispenser 1000 is designed to circulate ozone-enriched water through pipes of said water purifying vending dispenser 1000 before consuming drinking water via said outlet for drinking water in order to clean said pipes;

wherein in order to rinse, clean and disinfect the secondary filtering system (H), the water purifying vending dispenser 1000 circulates Ozone-enriched water from said treatment container (F) by and through pump (D) where the water is mixed with ozone and back to said secondary filtering system (H);

wherein said one or more first testing sensor (1001) is designed to test the quality of incoming water via said water inlet (1005); wherein said control unit (1007) is designed to determine intensity of treatment required according to said testing by controlling the amount of ozone to be pumped by water Ozone pump (D) from Ozone storage container (C) into said treatment container (F).

\* \* \* \* \*